United States Patent [19]

Nowara

[11] Patent Number: 5,718,096
[45] Date of Patent: *Feb. 17, 1998

[54] BOX-SHAPED STRUCTURES, SUCH AS BUILDINGS

[75] Inventor: Ekkehard Nowara, Ihlow-Riepe, Germany

[73] Assignee: Thyssen Nordseewerke GmbH, Emden, Germany

[*] Notice: The term of this patent shall not extend beyond the expiration date of Pat. No. 5,399,403.

[21] Appl. No.: 384,430

[22] Filed: Feb. 6, 1995

Related U.S. Application Data

[63] Continuation of Ser. No. 5,916, Jan. 15, 1993, Pat. No. 5,399,408.

[30] Foreign Application Priority Data

Jan. 18, 1992 [DE] Germany .......................... 42 01 250.3
Apr. 29, 1992 [DE] Germany .......................... 42 14 002.1

[51] Int. Cl.$^6$ .................... B32B 1/04; B32B 3/02; E04C 3/30; E04C 2/34
[52] U.S. Cl. .............. 52/794.1; 52/793.1; 52/576; 428/73; 428/74; 428/76; 428/119; 428/172; 428/182; 428/313.3
[58] Field of Search ............... 52/785.1, 788.1, 52/786.11, 786.13, 791.1, 793.1, 794.1, 576; 428/73, 74, 76, 119, 172, 182, 313.3, 316.6, 432, 433

[56] References Cited

U.S. PATENT DOCUMENTS

| | | |
|---|---|---|
| 3,264,165 | 8/1966 | Stickel .......................... 52/788.1 X |
| 3,861,971 | 1/1975 | Stapleford et al. . |
| 3,867,758 | 2/1975 | Johnson . |
| 3,879,518 | 4/1975 | Ney et al. . |
| 3,922,425 | 11/1975 | Plumberg . |
| 3,999,345 | 12/1976 | McKelvey ...................... 52/786.11 X |
| 4,084,366 | 4/1978 | Saylor et al. .................. 52/791.1 |
| 4,368,226 | 1/1983 | Mucaria ........................ 52/786.11 X |
| 4,463,043 | 7/1984 | Reeves et al. . |
| 4,486,482 | 12/1984 | Kobayashi et al. . |
| 4,514,450 | 4/1985 | Nowobilski et al. . |
| 4,671,994 | 6/1987 | Cochran, Jr. . |
| 4,767,431 | 8/1988 | Lewis et al. . |
| 4,772,093 | 9/1988 | Abele et al. . |
| 5,018,328 | 5/1991 | Cur et al. . |
| 5,157,893 | 10/1992 | Benson et al. . |
| 5,175,975 | 1/1993 | Benson et al. . |
| 5,252,408 | 10/1993 | Bridges et al. .................. 52/788.1 X |
| 5,376,424 | 12/1994 | Watanabe ....................... 52/794.1 X |
| 5,399,408 | 3/1995 | Nowara ........................... 428/73 |
| 5,500,305 | 3/1996 | Bridges et al. ................. 52/788.1 X |

FOREIGN PATENT DOCUMENTS

| | | |
|---|---|---|
| 0164006 | 12/1985 | European Pat. Off. . |
| 2615299 | 10/1977 | Germany . |
| 3108810 | 5/1982 | Germany . |
| 3108801 | 9/1982 | Germany . |
| 3630399 | 3/1988 | Germany . |
| 0715174 | 9/1954 | United Kingdom . |
| 0715175 | 9/1954 | United Kingdom . |
| 0730127 | 5/1955 | United Kingdom . |

Primary Examiner—Robert Canfield
Attorney, Agent, or Firm—Nils H. Ljungman and Associates

[57] ABSTRACT

Box-shaped structures, such as buildings. Such boxed-shape structures can include modular boxes. Other conceivable forms are paneled elements in plane and curved three-dimensional shapes, which may be used in such box-shaped structures. The paneled elements, in such a case, will be integrable with other paneled elements to form such box-shaped structures. The present invention can overcome the disadvantage encountered with many known vessels, containers and other similar structures, that they tend to be very complex and expensive to manufacture, or tend not to meet all of the requirements associated with such vessels, containers and other similar structures.

19 Claims, 2 Drawing Sheets

BOX-SHAPED STRUCTURES, SUCH AS BUILDINGS

This application is a continuation of U.S. patent application Ser. No. 08/005,916, which was filed on Jan. 15, 1993, and issued as U.S. Pat. No. 5,399,408, which issued on Mar. 21, 1995, and which claimed priority from Federal Republic of Germany patent applications No. P 42 01 250 and No. P 42 14 002.

BACKGROUND OF THE INVENTION

1. Field of the Invention

Generally, the present invention can relate to box-shaped structures, such as buildings. Such box-shaped structures can include modular boxes. Other conceivable forms contemplated by the present invention are paneled elements in plane and curved three-dimensional shapes, which may be used in such box-shaped structures. The paneled elements, in such a case, will be integrable with other paneled elements to form such box-shaped structures.

2. Background Information

In known vessels, containers, or other similar structures, the sides may be configured so as to provide heat insulation. In such an instance, the sides will essentially be integrated with respect to one another so as to form the vessel, container or similar structure in question, resulting in a structure which has several sides providing insulation capability.

In known vessels, containers and other similar structures, it is known to configure each side so that there is essentially a composite of different layers. It is conceivable that each side, with its composite of different layers, is integrable with a neighboring side in such a manner as to define the interior open space within the vessel, container or other similar structure in question.

In known vessels, containers and other similar structures, it is known to configure the type of side, having a composite of different layers as discussed immediately hereinabove, in such a manner that top and bottom areas of the composite side can be connected by material which extends from the top to bottom areas.

Essentially, many known vessels, containers and other similar structures have the disadvantage that they tend to be very complex and expensive to manufacture, or tend not to meet all of the requirements associated with such vessels, containers and other similar structures.

OBJECT OF THE INVENTION

An object of the invention is to eliminate the disadvantages just described and to create a vessel, container, box-shaped structure, building or other similar structure which can be manufactured easily, or have easily manufactured components, and still meet the above-mentioned requirements.

SUMMARY OF THE INVENTION

The above object can be achieved by the present invention, in that, elements can be provided to form the vessel, container, box-shaped structure, building or other similar structure in question by way of sides which include features described further herebelow.

It is believed that, in accordance with at least one preferred embodiment of the present invention, a measure of environmental compatibility can be achieved.

An additional feature of the invention contemplates that the stability of the structure in question can be increased by way of a simple variation on the general composite structure of the sides.

Bodies of essentially any desired shape are contemplated within the scope of the present invention. Conceivable forms are elements in plane and three-dimensional shapes, which may be utilized in vessels, containers, box-shaped structures, buildings or other similar structures, as well as tubes and modular boxes.

BRIEF DESCRIPTION OF THE DRAWINGS

The invention is explained in greater detail with reference to the embodiments illustrated the accompanying drawings, wherein:

FIG. 2 shows a thermal insulating body with two panels and a spacer in between; and FIG. 3 shows a thermal insulation body with two panels and two spacers in between.

Identical parts are identified by the same reference numbers in FIGS. 1–3.

DESCRIPTION OF THE PREFERRED EMBODIMENTS

Figure 1A:
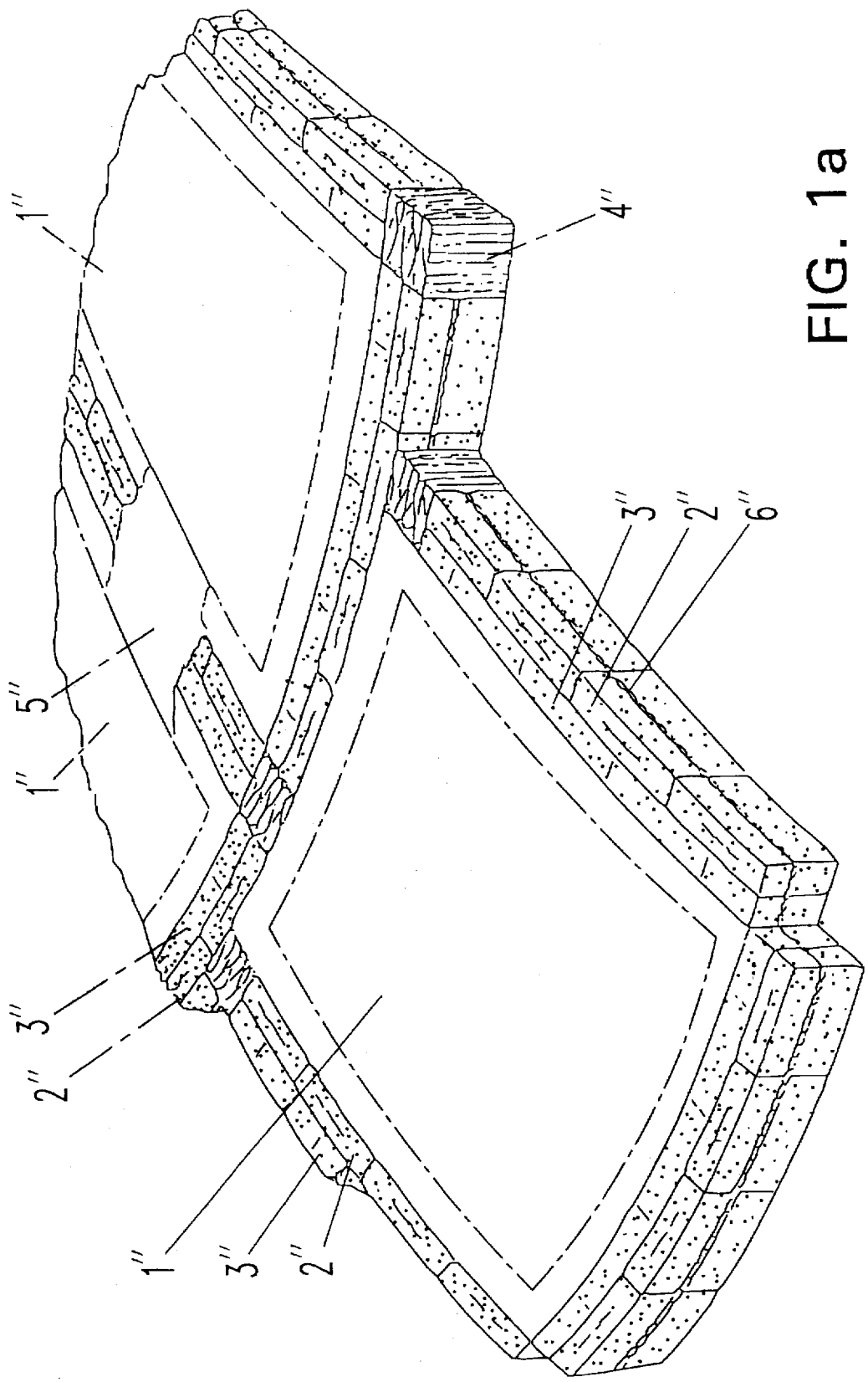
FIG. 1a shows adjoining panels, which may conceivably be used in a box-like structure.

FIG. 1a shows adjoining panels, which may conceivably be used in a box-like structure. The general arrangement of panels in FIG. 1a, and its incorporation into a greater structure, can be employed in conjunction with at least one preferred embodiment of the present invention. A detailed description of such an arrangement of panels, and the manner in which they adjoin to one another, is given in Federal Republic of Germany Patent No. 31 08 801, which is incorporated herein by reference.

The following is a brief list of components shown in FIG. 1a, based on the disclosure of Federal Republic of Germany Patent No. 31 08 801, which is incorporated herein by reference: adjoining panels 1", strips 2" and 3", "freestone" components 4", adhesive bands 5", reinforcement 6".

The remaining figures show a thermal insulating body, designated 8 overall, which preferably includes a shell 1 with an evacuation tube 7, panels 4 and perforated reflective film 2 located between the panel 4 and the shell 1. The end surfaces 3 of the thermal insulation body 8 are preferably poor thermal conductors.

Figure 2:
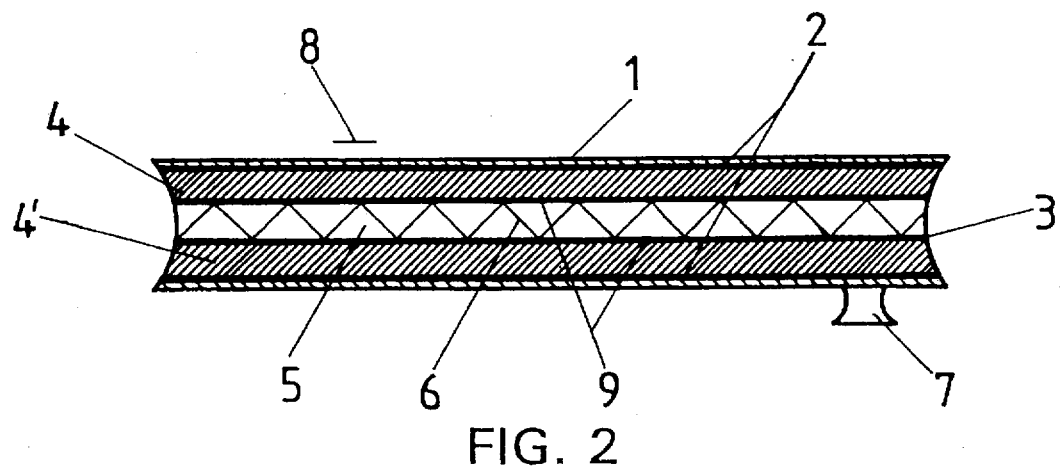

In the embodiment of the present invention shown in FIG. 2, there are preferably two panels 4, 4', between which there is preferably a compression-proof spacer 5 with ribs 6. Between the spacer level 5 and the panels 4, 4', there is also preferably a perforated reflective film 9.

Figure 3:
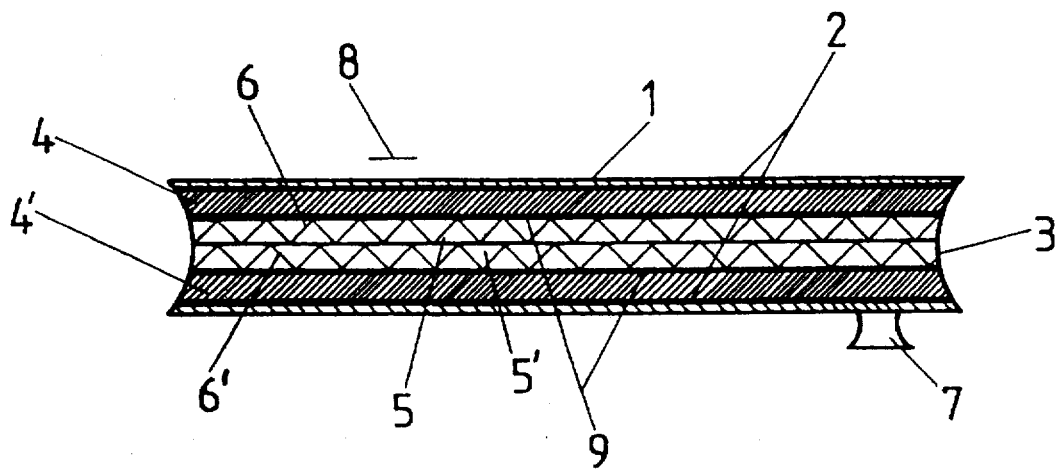

In FIG. 3, in addition to the spacer 5, there is an additional spacer 5' with ribs 6'. Essentially, this double spacer also reduces the weight and provides additional stiffness for the thermal insulating body 8.

The disclosure now turns to a more detailed description of the preferred embodiments of the present invention.

Referring again to FIG. 1, a thermal insulating body 8, in accordance with the present invention, preferably includes a shell 1. Shell 1 preferably includes an appropriate material, such as glass. Preferably, shell 1 is configured such that panel 4 is disposed therewithin. In other words, panel 4 may essentially be sandwiched between parts of shell 1.

Figure 1:
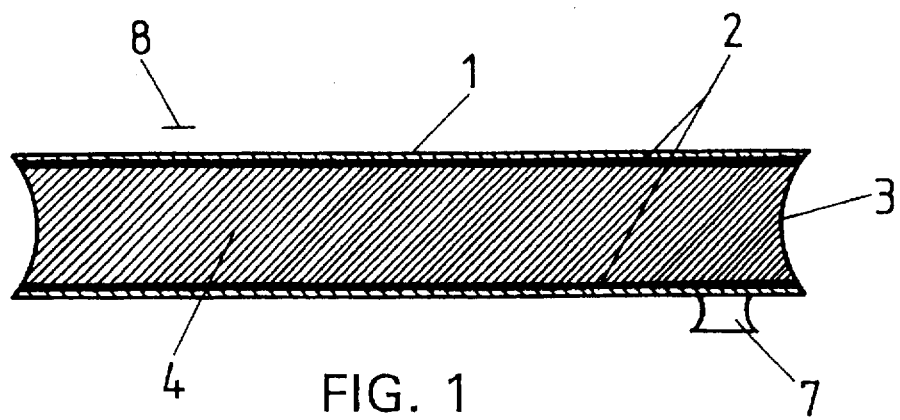
FIG. 1 shows a thermal insulating body with only one panel.

Preferably extending from a portion of shell 1 is an evacuation tube 7. The makeup and function of an evacuation tube 7 such as that shown in FIG. 1 is generally well-known to those of ordinary skill in the art, and thus will not be described in fuller detail here. However, it can be assumed that evacuation tube 7, in accordance with at least one embodiment of the present invention, would be capable of being suitably connected to an evacuation device (e.g. a device capable of providing a suction force to effect evacuation of the interior of shell 1.

Preferably, panel 4 includes compression-proof and baked fibrillar micro glass fibers. Preferably, the fibrillar micro glass fibers are formed into a three-dimensional panel by compacting, and are preferably pressed into a panel without a binding agent. As has been mentioned heretofore, the fibrillar micro glass fibers preferably have different diameters and different fiber lengths, examples of which have been set forth heretofore.

Preferably, located on either side of panel 4, between panel 4 and shell 1 is reflective film 2. As has been mentioned heretofore, this reflective film is preferably perforated although, of course, it is possible, within the scope of the present invention, to employ another type of reflective arrangement, such as a reflective coating. Any of several well-known means may be employed to perforate reflective film 2 and, additionally, such perforation may be embodied by any appropriate arrangement and makeup of perforations. For example, it is essentially possible, within the scope of the present invention, to render a generally uniform array of circular, rectangular, or slotted perforations throughout reflective film 2. It may essentially now be appreciated that thermal insulating body 8 may largely be embodied by a sandwiched arrangement of mutually contacting components. Such a sandwiched arrangement of mutually contacting components may essentially be expressed as follows, progressing from an upper portion of FIG. 1 to a lower portion: shell 1, reflective film 2, panel 4, reflective film 2, shell 1.

As has been mentioned heretofore, the end surfaces 3 of the thermal insulation body 8 are preferably poor thermal conductors. Essentially, it is possible to utilize, in accordance with the present invention, any of several suitable materials lending themselves to poor thermal conductivity, including glass materials, plastic materials, and, possibly, flexible materials (e.g. rubber or elastomer). Also, it will be appreciated from all of the figures that end surfaces 3 are preferably concave towards panel 4.

It will be appreciated from FIG. 1 that, in accordance with at least one preferred embodiment of the present invention, shell 1 may be considered as having two opposing side portions, each being positioned adjacent a corresponding reflective film 2. Panel 4 may be considered as having several sides, including the four sides illustrated in FIG. 1. The two sides of panel 4 that run parallel to the side portions of shell 1 may be considered "longitudinal side portions" of panel 4.

The embodiment of the present invention presented in FIG. 2 includes essentially the same components as the embodiment of FIG. 1, but also includes a compression-proof spacer 5. As has been mentioned heretofore, such a spacer 5 may be in the form of perforated double-rib boards, or may be in the form of a perforated honeycomb mesh. As shown, spacer 5 preferably includes ribs 6 therewithin. As illustrated, ribs 6 could conceivably be arranged in a zig-zag manner or in any manner deemed suitable to provide the desired support. The zig-zag arrangement may be considered to be "double ribbing". Compression-proof spacer 5 preferably includes portions that are parallel to the side portions of shell 1, with the ribs 6 extending between such portions of spacer 5.

Thus, in accordance with the embodiment of the present invention shown in FIG. 2, there may preferably be two panels 4, 4' separated by spacer 5. In this regard, another perforated reflective film 9, preferably similar to reflective film 2, may preferably be provided between panel 4 and spacer 5 and between panel 4' and spacer 5. Thus, the insulting body 8 shown in FIG. 2 may also be considered to be embodied by a sandwiched arrangement of mutually contacting components. This sandwiched arrangement may essentially be expressed as follows, progressing from an upper portion of FIG. 2 to a lower portion: shell 1, reflective film 2, panel 4, reflective film 9, spacer 5, reflective film 9, panel 4', reflective film 2, shell 1.

The embodiment shown in FIG. 3 is, preferably, essentially similar to that shown in FIG. 2 but preferably includes two spacers instead of one. These two spacers, which may also be termed a "double-spacer", are indicated at 5 and 5'and, respectively, each preferably include ribs 6 and 6'. Thus, the insulting body 8 shown in FIG. 3 may also be considered to be embodied by a sandwiched arrangement of mutually contacting components. This sandwiched arrangement may essentially be expressed as follows, progressing from an upper portion of FIG. 3 to a lower portion: shell 1, reflective film 2, panel 4, reflective film 9, spacer 5, spacer 5', reflective film 9, panel 4', reflective film 2, shell 1.

One feature of the invention resides broadly in the thermal insulating body for thermal insulation, consisting of a shell which can be evacuated and is filled with a solid, microporous thermal insulation material, characterized by the fact that at least the end surfaces 3 of the shell 1 consist of material which is a poor thermal conductor, that the microporous thermal insulation material consists of compression-proof and baked fibrillar micro glass fibers, and that the fibrillar micro glass fibers are formed in a compacting by pressing as three-dimensional panels 4.

Another feature of the invention resides broadly in the thermal insulation body, characterized by the fact that the micro glass fibers are pressed into panels 4 without a binding agent.

Yet another feature of the invention resides broadly in the thermal insulation body, characterized by the fact that the thermal insulation material consists of a mixture of fibrillar micro glass fibers with different diameters and different fiber lengths.

Still another feature of the invention resides broadly in the thermal insulation body, characterized by the fact that the side surfaces of the panels 4 have perforated, reflective films or a reflective coating.

Still yet another feature of the invention resides broadly in the thermal insulation body, characterized by the fact that at least two panels 4, 4' are located on one top of the other, and that there is at least one compression-proof spacer 5 between each two panels 4, 4'.

Another feature of the invention resides broadly in the thermal insulation body, characterized by the fact that the spacer levels 5 are designed as perforated double-rib boards with different ribs 6.

Yet another feature of the invention resides broadly in the thermal insulation body, characterized by the fact that the spacer 5 is designed as a perforated honeycomb mesh.

Further, the present invention can generally relate to a thermal insulating body for thermal insulation, wherein the body essentially consists of a shell, or casing, or covering, which can be evacuated and which is filled with a solid, microporous thermal insulator.

The insulation principle of the Dewar flask is known. This principle is based on the evacuation of a cavity which can be sealed gastight. In vessels such as the Dewar flask, the container walls are generally also heat-reflective, to minimize the conduction of heat by radiation.

Thermal insulation bodies based on pressed, microporous thermal insulating material are disclosed in European Patent No. EP-0164006. It is known to provide such bodies with a full or partial gastight shell, and to set the pressure inside the gastight shell to at least 20 mbar. It is also known to use a compound film made of thermoplastic material, with a metal layer on one side, as the shell material.

German Patent No. DE-2615299 discloses the manufacture of a container for thermal insulation bodies, such as those just described, from thin sheet metal, and discloses connecting the bottom and top areas by very thin, creased, or flanged, metal foils. The same process is also proposed in German patent No. DE-3630399.

German Patent No. DE-3108810 relates to insulation, having an elasticity of elongation. This insulation includes panels with lateral surfaces oriented in pairs, parallel to one another, and of strips of a thermal insulation material which elastically deforms in only one direction. The strips are attached by adhesive to one another and to the panels at the contact surfaces.

Essentially, all the known thermal insulating bodies have the disadvantage that they tend to be very complex and expensive to manufacture, or tend not to meet all the requirements for compression strength and rigidity.

An object of the invention is therefore to eliminate the disadvantages just described and to create a thermal insulating body which can be manufactured easily and still meet the above-mentioned requirements.

This object is achieved by the invention, in that, preferably, at least the end surfaces of the shell include material which is a poor thermal conductor, that the microporous thermal insulation material preferably includes compression-proof and baked fibrillar micro glass fibers, and that the fibrillar micro glass fibers are preferably formed in a compacting process by pressing the same into three-dimensional panels.

In one embodiment of the present invention, the micro glass fibers are preferably pressed into three-dimensional panels without binding agents. The result is a panel which has open pores (i.e. pores that are not otherwise filled with the material of bindings agents), which essentially makes the evacuation of the thermal insulation body a great deal easier. With regard to environmental compatibility, it should also be noted that a panel manufactured without binding agents can essentially be completely recycled. Thus, such a panel may preferably be prepared so that it can be used in insulation bodies of another three-dimensional shape.

Different fiber diameters and lengths can be used as appropriate to achieve an optimization between rigidity and thermal conductivity. Most of the micro glass fibers can preferably have a diameter on the order of magnitude of:

$d_1 = 0.68 \times 10^{-3}$ mm or $d_2 = 3 \times 10^{-3}$ mm.

In a preferred embodiment of the present invention, most of the fibers can preferably be between 1.5 mm and 6 mm long.

Thus, under the conditions of optimization just mentioned, most of the micro glass fibers can preferably have a diameter on the order of magnitude of:

$d_1 = 0.68 \times 10^{-3}$ mm or $d_2 = 3 \times 10^{-3}$ mm.

Accordingly, in another preferred embodiment of the present invention, most of the fibers can preferably be between 0.04 and 6 millimeters long. The use of micro glass fibers with diameters and lengths outside the ranges indicated immediately above is possible, of course, but results in adverse effects in terms of rigidity and/or thermal conductivity.

To take into consideration the most favorable IR (infrared) reflection behavior of reflective films, the invention also proposes that the lateral surfaces of the panels be provided with perforated, reflective films. Essentially, the perforation of the films is desirable to avoid any adverse affect on the evacuation behavior of the thermal insulation body, which evacuation behavior is already promoted by the open porosity of the panels.

To further increase the insulation capabilities, the stability or torsion strength of the panel, an additional configuration of the invention proposes that at least two panels can be located one on top of the other, and that there can be at least one compression-proof spacer between each two panels.

In order not to reduce the compression strength of the single-panel thermal insulation body, the compression strength of the spacer should preferably correspond to at least the compression strength of the respective panels. For this purpose, preference is generally given to spacer levels made of plastic and designed as perforated double-ribbed boards with different ribs.

It is possible, however, that the spacer can also be designed as a perforated honeycomb mesh. Here again, with regard to the easy evacuation of the thermal insulating body, a high value can be placed on a perforation of the spacer. Essentially, such a spacer can preferably occupy the greatest part of the volume of a thermal insulating body. The number of support ribs in such spacer levels should preferably be kept low, to keep the thermal conductivity low. Here again, as with the panels, there can be a shell with a reflective and perforated film or a reflective coating, to minimize the radiation component of the thermal transmission.

Bodies of essentially any desired shape can be manufactured with the thermal insulating bodies according to the invention. Conceivable forms are paneled flat elements in plane and curved three-dimensional shapes, tubes, modular boxes, etc.

In recapitulation, the present invention can generally relate to a thermal insulating body, or molding, for thermal insulation, consisting of a shell which can be evacuated and which is filled with a solid, microporous thermal insulating material, is characterized by the fact that at least the end surfaces of the shell consist of material which is a poor thermal conductor, that the microporous thermal insulation material consists of compression-proof and baked fibrillar micro glass fibers, and that the fibrillar micro glass fibers are compacted and pressed into three-dimensional panels.

Examples of baking micro glass fibers, which may be utilized in accordance with the embodiments of the present invention, may be found in the following U.S. Pat. No. 4,270,840, which issued to Uchida et al. on Jun. 2, 1981; U.S. Pat. No. 3,980,390, which issued to Yamamoto et al. on Sep. 14, 1976; and U.S. Pat. No. 3,867,758, which issued to Johnson on Feb. 25, 1975.

Examples of compacting micro glass fibers, which may be utilized in accordance with the embodiments of the present invention, may be found in the following U.S. Pat. No. 3,922,425, which issued to Plumberg on Nov. 25, 1975; U.S. Pat. No. 3,879,518, which issued to Ney et al.; and U.S. Pat. No. 3,861,971, which issued to Stapleford et al. on Jan. 21, 1975.

Examples of the binding of micro glass fibers, which may be utilized in accordance with the embodiments of the present invention, may be found in the following U.S. Pat. No. 4,917,764, which issued to Lalwani, et al. on Apr. 17, 1990; U.S. Pat. No. 4,258,098, which issued to Bondoc, et al. on Mar. 24, 1981; and U.S. Pat. No. 4,255,485, which issued to Yau on Mar. 10, 1981.

Examples of micro glass fibers, which may be utilized in accordance with the embodiments of the present invention, may be found in the U.S. patents listed above and also in the following U.S. Pat. No. 4,772,093, which issued to Abele et al. on Sep. 20, 1988; and U.S. Pat. No. 4,767,431, which issued to Lewis et al. on Aug. 30, 1988.

Examples of materials having poor thermal conductivity, which may be utilized in accordance with the embodiments of the present invention, may be found in the following U.S. Pat. No. 5,094,055, which issued to Berdan on Mar. 10, 1992; U.S. Pat. No. 3,897,197, which issued to Jirmanus, et al. on Jul. 29, 1975; U.S. Pat. No. 4,444,821, which issued to Young et al. on Apr. 24, 1984; and U.S. Pat. No. 5,125,195, which issued to Brede on Jun. 30, 1992.

Examples of infrared reflection arrangements, which may be utilized in accordance with the embodiments of the present invention, may be found in the following U.S. Pat. No. 5,089,705, which issued to Ueda et al. on Feb. 18, 1992; U.S. Pat. No. 4,971,843, which issued to Michelotti et al. on Nov. 20, 1990; U.S. Pat. No. 4,725,452, which issued to Edward et al. on Feb. 16, 1988; and U.S. Pat. No. 4,038,797, which issued to Hermann et al. on Aug. 2, 1977.

Examples of honeycomb mesh, which may be utilized in accordance with the embodiments of the present invention, may be found in the following U.S. Pat. No. 5,106,227, which issued to Ahmad, et al. on Apr. 21, 1992; and U.S. Pat. No. 4,767,309, which issued to Mizuno et al. on Aug. 30, 1988.

The German patent applications corresponding to the instant U.S. patent application are Ser. No. P 42 01 250 and No. P 42 14 002.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A panel for being incorporated into a thermal insulating body for providing thermal insulation, said panel comprising:

a shell portion having an interior portion therewithin; said shell portion comprising a pair of opposing side portions;

a panel portion being disposed within the interior portion of the shell portion and between said opposing side portions of said shell portion, said panel portion having a plurality of sides;

said panel portion comprising glass fibers;

said glass fibers comprising baked fibrillar micro glass fibers;

said glass fibers comprising a compacted and compression-proof glass fiber three dimensional structure;

at least one end surface portion being disposed at at least one side of said panel portion;

said at least one end surface portion:
being integrally connected with at least one side portion of said shell portion;
comprising a material being a poor thermal conductor; and
extending between said opposing side portions of said shell portion; and said interior of said shell portion being evacuated.

2. The panel according to claim 1, wherein:

said at least one end surface portion comprises two end surface portions, each of said two end surface portions being disposed at corresponding opposing sides of said panel portion;

both of said two end surface portions are integrally connected with said shell portion and extend between said opposing side portions of said shell portion;

both of said two end surface portions comprise said material being a poor thermal conductor;

each of said glass fibers has a diameter and a fiber length;

said glass fibers together consist of a plurality of glass fibers having differing diameters and differing fiber lengths;

most of said glass fibers having a diameter in the range of ten-thousandths of millimeters to tenths of millimeters; and most of said glass fibers having a length in the range of fractions of thousandths of millimeters to tens of millimeters.

3. The panel according to claim 2, wherein:

said compacted and compression-proof glass fiber three dimensional structure comprises at least one three dimensional panel; and said compacted glass fibers are pressed together in each of said at least one three-dimensional panel.

4. The panel according to claim 3, wherein said compacted glass fibers are pressed together without a binding agent.

5. The panel according to claim 4, wherein:

said sides of said panel portion comprise a pair of opposing longitudinal side portions extending between said two end surface portions;

each of said longitudinal side portions of said panel portion comprises reflective means, said reflective means being disposed along each of said longitudinal side portions;

each said reflective means comprises one of:
a reflective film, said reflective film being disposed on each of said longitudinal side portions of said panel portion; and
a reflective coating, said reflective coating being disposed on each of said longitudinal side portions of said panel portion.

6. The panel according to claim 5, wherein said panel portion comprises a panel for facilitating the evacuation of said interior portion of said shell portion.

7. The panel according to claim 6, wherein:

most of said micro glass fibers have one of the following diameters:
$d_1$=about $0.68 \times 10^{-3}$ millimeters; and
$d_2$=about $3 \times 10^{-3}$ millimeters;

most of said micro glass fibers have a length of between about 0.04 millimeters and about 6 millimeters;

said shell portion comprises a glass material;

said thermal insulating body further comprises an evacuation tube for evacuating said interior portion of said shell portion;

said reflective means is configured for minimizing radiation from thermal transmissions;

each said reflective means comprises solely said reflective film;

said poor thermal conductor material comprises one of: glass material, a plastic material and a flexible material;

said panel portion comprises a main body portion defined within said end surface portions and said longitudinal side portions;

each said end surface portion of said panel portion is concave into said main body portion of said panel portion and describes an arc length of approximately 67°;

said panel portion comprises only one three-dimensional panel;

each of said reflective films having a significantly small thickness;

said shell portion comprises a pair of opposing side portions, said opposing side portions being parallel to said longitudinal side portions of said panel;

said evacuation tube extends away from one of said side portions of said shell portion;

said thermal insulating body consists of:
said evacuation tube;
a sandwiched arrangement of mutually contacting components;
said sandwiched arrangement of mutually contacting components comprises, in the following order:
one of said sides of said shell portion;
a first said reflective film;
said panel portion;
a second said reflective film; and the other of said sides of said shell portion; and
said end surface portions of said panel portion extending between said sides of said shell portion.

8. The panel according to claim 6, wherein:

most of said micro glass fibers have one of the following diameters:
$d_1$=about $0.68 \times 10^{-3}$ millimeters; and
$d_2$=about $3 \times 10^{-3}$ millimeters;

most of said micro glass fibers have a length of between about 0.04 millimeters and about 6 millimeters;

said shell portion comprises a glass material;

said thermal insulating body further comprises an evacuation tube for evacuating said interior portion of said shell portion;

said reflective means is configured for minimizing radiation from thermal transmissions;

each said reflective means comprises solely said reflective film;

said poor thermal conductor material comprises one of: a glass material, a plastic material and a flexible material;

said panel portion comprises a main body portion defined within said end surface portions and said longitudinal side portions;

each said end surface portion of said panel portion is concave into said main body portion of said panel portion and describes an arc length of approximately 67°;

said panel portion comprises a pair of three-dimensional panels and spacer means, said spacer means being disposed between said pair of three-dimensional panels;

said spacer means comprises at least one compression-proof spacer;

each of said at least one compression-proof spacer comprises one of:
an arrangement comprising a plurality of double-rib boards, said double-rib boards comprising a plurality of ribs, said ribs being configured for supporting each said at least one spacer to resist compression forces on each said at least one compression-proof spacer, said ribs forming a general zigzag pattern within each said at least one compression-proof spacer; and
a mesh configured for resisting compression forces;

each of said at least one compression-proof spacer is made of plastic;

each of said three-dimensional panels has a thickness defined in a direction perpendicular to said longitudinal surface portions of said panel portion;

said three-dimensional panels are of generally equal thickness;

each of said reflective films has a significantly small thickness;

each said three-dimensional panel comprises a pair of side portions, one from said pair of side portions of each said three-dimensional panel corresponding to a longitudinal side portion of said panel portion, the other from said pair of side portions of each said three-dimensional panel being disposed opposite the said side portion corresponding to a longitudinal side portion of said panel portion;

each said three-dimensional panel comprises a further reflective film;

each said further reflective film is disposed between the corresponding three-dimensional panel and said spacer means;

each said further reflective film is configured for minimizing radiation from thermal transmissions;

said shell portion comprises a pair of opposing side portions, said opposing side portions being parallel to said longitudinal side portions of said panel;

said evacuation tube extends away from one of said side portions of said shell portion;

said thermal insulating body consists of:
said evacuation tube;
a sandwiched arrangement of mutually contacting components;
said sandwiched arrangement of mutually contacting components comprising, in the following order:
one of said side portions of said shell portion;
a first said reflective film;
a first of said three-dimensional panels;

a first said further reflective film;
said at least one compression-proof spacer;
a second said further reflective film;
a second of said three-dimensional panels;
a second said reflective film; and
the other of said side portions of said shell portion; and
said end surface portions of said panel portion; said at least one compression-proof spacer consists of two compression-proof spacers;
each of said two compression-proof spacers comprises said arrangement comprising a plurality of perforated double-rib boards;
said thermal insulating body has a thickness defined through said pair of three-dimensional panels and said two compression-proof spacers;
each of said two compression-proof spacers has a thickness defined parallel to the thickness of said thermal insulating body;
said two compression-proof spacers being of generally equal thickness;
each of said two compression-proof spacers having approximately the same thickness as each of said pair of three-dimensional panels; and
the thickness of each of said pair of three-dimensional panels and of each of said two compression-proof spacers constituting about one-fourth the thickness of said thermal insulating body.

9. A thermal insulating body for providing thermal insulation, said insulating body comprising:
at least one panel;
at least one of said at least one panel comprising:
a pair of opposing side portions;
two end portions disposed between said opposing side portions;
an interior portion between said opposing side portions;
glass fibers disposed in said interior portion between said opposing side portions;
said glass fibers comprising baked fibrillar micro glass fibers; and
said glass fibers comprising a compacted and compression-proof glass fiber three-dimensional panel;
said two end portions comprising a material being a poor thermal conductor, extending between said opposing side portions; and
said interior portion being evacuated.

10. The thermal insulating body as claimed in claim 9 comprising:
a shell having two sides and two end surfaces;
each of said two end surfaces of said shell comprises a material being a poor thermal conductor, extending between said sides of said shell; and
said at least one panel being disposed within said shell.

11. The thermal insulating body as claimed in claim 10 wherein:
each of said glass fibers has a diameter and a fiber length;
said glass fibers together consist of a plurality of glass fibers having differing diameters and differing fiber lengths;
most of said glass fibers having a diameter in the range of ten-thousandths of millimeters to tenths of millimeters; and
most of said glass fibers having a length in the range of fractions of thousandths of millimeters to tens of millimeters.

12. The thermal insulating body as claimed in claim 11 wherein:
said panel comprises means for facilitating evacuation of said interior portion; and
said glass fibers are pressed together in said compression-proof glass fiber three-dimensional panel.

13. The thermal insulating body as claimed in claim 12 wherein said glass fibers are pressed together without a binding agent.

14. The thermal insulating body as claimed in claim 13 comprising:
an evacuation tube for evacuating said interior portion;
each of said side portions of said at least one of said at least one panel comprising reflective means, said reflective means being disposed along each of said side portions;
each said reflective means comprising one of:
a reflective film, said reflective film being disposed on each of said side portions; and
a reflective coating, said reflective coating being disposed on each of said side portions.

15. The thermal insulating body as claimed in claim 14 wherein:
said means for facilitating evacuation of said interior portion comprises said compression-proof glass fiber three-dimensional panel.

16. The thermal insulating body as claimed in claim 15 wherein:
said at least one panel comprises only one three-dimensional panel;
said two end portions of said panel extend between said sides of said shell;
said two end portions of said panel are concave into said interior of said panel;
said two end surfaces of said shell are concave toward each other;
most of said micro glass fibers have one of the following diameters:
$d_1$=about $0.68 \times 10^{-3}$ millimeters; and
$d_2$=about $3 \times 10^{-3}$ millimeters; and
most of said micro glass fibers have a length of between about 0.04 millimeters and about 6 millimeters.

17. The thermal insulating body as claimed in claim 15 wherein:
said at least one panel comprises two three-dimensional panels;
each of said two three-dimensional panels is disposed along a side of said shell;
said thermal insulating body comprises spacer means being disposed between said two three-dimensional panels for separating said two three-dimensional panels;
said two end portions of each of said two panels are concave into said interior of each of said two panels; and
said two end surfaces of said shell are concave toward each other.

18. The thermal insulating body as claimed in claim 17 wherein:
said spacer means comprises at least one compression-proof spacer;
each of said at least one compression-proof spacer comprises one of:

an arrangement comprising a plurality of double rib boards, said double rib boards comprising a plurality of ribs, said ribs being configured for supporting each said at least one spacer to resist compression forces on each said at least one compression-proof spacer, said ribs forming a general zigzag pattern within each said at least one compression-proof spacer; and a mesh configured for resisting compression forces;

each said panel comprises a further reflective film;

each said further reflective film is disposed between said corresponding three-dimensional panel and said spacer means;

most of said micro glass fibers have one of the following diameters:
- $d_1$=about $0.68 \times 10^{-3}$ millimeters; and
- $d_2$=about $3 \times 10^{-3}$ millimeters; and most of said micro glass fibers have a length of between about 0.04 millimeters and about 6 millimeters.

19. A thermal insulating body for providing thermal insulation, said insulating body comprising:

at least one panel;

at least one of said at least one panel comprising:

a pair of opposing side portions;

two end portions disposed between said opposing side portions;

an interior portion between said opposing side portions, glass fibers disposed in said interior portion between said opposing side portions;

said glass fibers comprising baked fibrillar micro glass fibers; and said glass fibers comprising a compacted and compression-proof glass fiber three-dimensional panel; and said interior portion being evacuated.

* * * * *

UNITED STATES PATENT AND TRADEMARK OFFICE
CERTIFICATE OF CORRECTION

PATENT NO. : 5,718,096
DATED : February 17, 1998
INVENTOR(S) : Ekkehard NOWARA

It is certified that error appears in the above-identified patent and that said Letters Patent is hereby corrected as shown below:

```
     On the title page, item [*], after No., delete
"5,399,403" and insert --5,399,408--.
```

Signed and Sealed this

Fourteenth Day of March, 2000

Attest:

Q. TODD DICKINSON

Attesting Officer

Commissioner of Patents and Trademarks